United States Patent
Choudhury et al.

(10) Patent No.: US 10,469,312 B1
(45) Date of Patent: *Nov. 5, 2019

(54) METHODS AND APPARATUS FOR SCALABLE RESILIENT NETWORKS

(71) Applicant: Juniper Networks, Inc., Sunnyvale, CA (US)

(72) Inventors: Abhijit Choudhury, Cupertino, CA (US); James Murphy, Alameda, CA (US); Pranay Pogde, Sunnyvale, CA (US); Shine-Chu Wang, Sunnyvale, CA (US); Rajagopalan Sivaramakrishnan, Sunnyvale, CA (US); Raghavendra Mallya, Cupertino, CA (US); Ileana J. Membreno, Hayward, CA (US); Sandip Shah, Milpitas, CA (US); Yung-Ching Tseng, Los Gatos, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 3 days.

This patent is subject to a terminal disclaimer.

(21) Appl. No.: 15/884,003

(22) Filed: Jan. 30, 2018

Related U.S. Application Data

(63) Continuation of application No. 15/338,078, filed on Oct. 28, 2016, now Pat. No. 9,906,407, which is a
(Continued)

(51) Int. Cl.
*H04L 12/24* (2006.01)
*H04L 12/803* (2013.01)

(52) U.S. Cl.
CPC ...... *H04L 41/0695* (2013.01); *H04L 41/0668* (2013.01); *H04L 41/0816* (2013.01); *H04L 47/125* (2013.01)

(58) Field of Classification Search
CPC ......... H04L 45/02; H04L 45/04; H04L 45/10; H04L 12/66; H04L 2012/46; H04L 2012/5618; H04L 12/46; H04L 12/4625; H04L 12/462; H04L 12/40097; H04L 12/40091; H04L 47/10; H04L 47/30; H04L 47/11; H04L 47/12; H04L 47/35;
(Continued)

(56) References Cited

U.S. PATENT DOCUMENTS

| | | |
|---|---|---|
| 4,342,079 A | 7/1982 | Stewart |
| 4,979,108 A | 12/1990 | Crabbe, Jr. |

(Continued)

OTHER PUBLICATIONS

Office Action for U.S. Appl. No. 13/629,824, dated May 20, 2014.
(Continued)

*Primary Examiner* — Brenda H Pham
(74) *Attorney, Agent, or Firm* — Cooley LLP

(57) ABSTRACT

In some embodiments, an apparatus includes a first controller configured to be operatively coupled within a network having a set of network nodes, a forwarding gateway and a configuration entity. The first controller is configured to manage session state and node state associated with the set of network nodes independent of the forwarding gateway. The first controller is configured to fail over to a second controller when the first controller fails, without the forwarding gateway failing over and without the configuration entity failing over.

20 Claims, 6 Drawing Sheets

Related U.S. Application Data continuation of application No. 14/630,028, filed on Feb. 24, 2015, now Pat. No. 9,485,138, which is a continuation of application No. 13/629,824, filed on Sep. 28, 2012, now Pat. No. 8,971,173.

(58) Field of Classification Search
CPC ... H04L 47/32; H04L 5/0053; H04L 12/5602; H04L 2012/5635; H04L 2012/5636; H04L 2012/5631; H04L 47/127
See application file for complete search history.

(56) References Cited

U.S. PATENT DOCUMENTS

| | | | |
|---|---|---|---|
| 5,136,498 A | | 8/1992 | McLaughlin |
| 5,146,401 A | * | 9/1992 | Bansal ............... G05B 19/0421 700/9 |
| 7,197,547 B1 | * | 3/2007 | Miller ................. G06F 16/9574 709/223 |
| 7,487,239 B2 | | 2/2009 | Childress et al. |
| 7,991,016 B2 | | 8/2011 | Cankaya |
| 8,971,173 B1 | * | 3/2015 | Choudhury ........... H04L 47/125 370/216 |
| 9,485,138 B1 | * | 11/2016 | Choudhury ........... H04L 47/125 |
| 2003/0097607 A1 | | 5/2003 | Bessire |
| 2004/0008700 A1 | | 1/2004 | Visser et al. |

OTHER PUBLICATIONS

Final Office Action for U.S. Appl. No. 13/629,824, dated Sep. 5, 2014.

Office Action for U.S. Appl. No. 14/630,028, dated Dec. 10, 2015.

Final Office Action for U.S. Appl. No. 14/630,028, dated May 6, 2016.

* cited by examiner

| Controller Designation Table 400 | | |
|---|---|---|
| Node Identifier 420 | Primary Controller 440 | Secondary Controller 460 |
| Node Identifier 1 | Controller 1 | Controller 2 |
| Node Identifier 2 | Controller 2 | Controller 1 |
| Node Identifier 3 | Controller 1 | Controller 4 |
| Node Identifier 4 | Controller 3 | Controller 2 |

FIG. 4

Designation Table 600

| VLAN Identifier 620 | Status 640 |
|---|---|
| VLAN Identifier 1 | Primary |
| VLAN Identifier 2 | Secondary |
| VLAN Identifier 3 | Primary |
| VLAN Identifier 4 | Secondary |
| VLAN Identifier 5 | N/A |

FIG. 6

METHODS AND APPARATUS FOR SCALABLE RESILIENT NETWORKS

CROSS-REFERENCE TO RELATED APPLICATIONS

This application is a continuation of U.S. patent application Ser. No. 15/338,078, (now U.S. Pat. No. 9,906,407), filed on Oct. 28, 2016 and entitled "Methods and Apparatus for Scalable Resilient Networks," which is a continuation of, and claims priority to and the benefit of, U.S. patent application Ser. No. 14/630,028, (now U.S. Pat. No. 9,485,138), filed Feb. 24, 2015 and entitled "Methods and Apparatus for Scalable Resilient Networks," which in turn is a continuation of, and claims priority to and the benefit of, U.S. patent application Ser. No. 13/629,824, (now U.S. Pat. No. 8,971,173), entitled "Methods and Apparatus for Scalable Resilient Networks" and filed Sep. 28, 2012. The contents of the aforementioned applications are herein by reference in their entireties.

BACKGROUND

Some embodiments described herein relate generally to scalable resilient networks.

In some known networks, a control plane and a data plane of the networks are inextricably interrelated. Such known networks can typically support a certain data throughput on the data plane and a certain number of sessions on the control plane. As a result of the close coupling of the control plane and the data plane, each of the control plane and the data plane typically cannot scale or failover independently of each other. Specifically, if one of the control plane or the data plane needs to be expanded, the other one typically has to be expanded as well even if adequate capability otherwise exists. Additionally, the failure of one of the control plane or the data plane typically requires both planes to fail over.

Accordingly, a need exists for methods and apparatus that enable a decoupled control plane and a data plane that can scale and failover independently of each other.

SUMMARY

In some embodiments, an apparatus includes a first controller configured to be operatively coupled within a network having a set of network nodes, a forwarding gateway and a configuration entity. The first controller is configured to manage session state and node state associated with the set of network nodes independent of the forwarding gateway. The first controller is configured to fail over to a second controller when the first controller fails, without the forwarding gateway failing over and without the configuration entity failing over.

BRIEF DESCRIPTION OF THE DRAWINGS

FIG. 4 is a schematic illustration of a controller designation table implemented in a controller, according to an embodiment.

FIG. 6 is a schematic illustration of a designation table implemented in a forwarding gateway, according to an embodiment.

DETAILED DESCRIPTION

In some embodiments, an apparatus includes a first controller configured to be operatively coupled within a network having a set of network nodes, a forwarding gateway and a configuration entity. The first controller can be designated by a master controller to manage control plane session state and node state associated with the set of network nodes independent of the forwarding gateway. In some embodiments, the first controller can be configured to send the control plane session state to the forwarding gateway such that the forwarding gateway sends data plane session state associated with a virtual local area network (VLAN) to the set of network nodes based on the control plane session state.

In some embodiments, the master controller can be operatively coupled to and configure a second controller during a second time period after a first time period during which the master controller was not operatively coupled to and did not configure the second controller. In such embodiments, control plane resources of the network during the second time period are different than control plane resources of the network during the first time period; while data plane resources of the network during the second time period can substantially correspond to data plane resources of the network during the first time period. In other words, the second controller can be added to the network without increasing data plane resources of the network. Furthermore, the first controller can be configured to load balance with at least the second controller during the second time period.

In some embodiments, the first controller can be configured to be operatively coupled to a set of controllers interconnected in a mesh configuration and within the network. The first controller can be configured to send session state and node state to each controller within the set of controllers. Similarly, the first controller can be configured to receive session state and node state from each controller within the set of controllers.

In some embodiments, the first controller can be physically co-located with at least one of the forwarding gateway or the configuration entity. In some embodiments, the first controller can be configured to fail over to a third controller when the first controller fails, without the forwarding gateway failing over and without the configuration entity failing over.

As used herein, a module can be, for example, any assembly and/or set of operatively-coupled electrical components, and can include, for example, a memory, a processor, electrical traces, optical connectors, software (executing in hardware), and/or the like. As used herein, the singular forms "a," "an" and "the" include plural referents unless the context clearly dictates otherwise. Thus, for example, the term "a controller designation table" is intended to mean a single table or a set of tables with similar functionalities.

Figure 1:
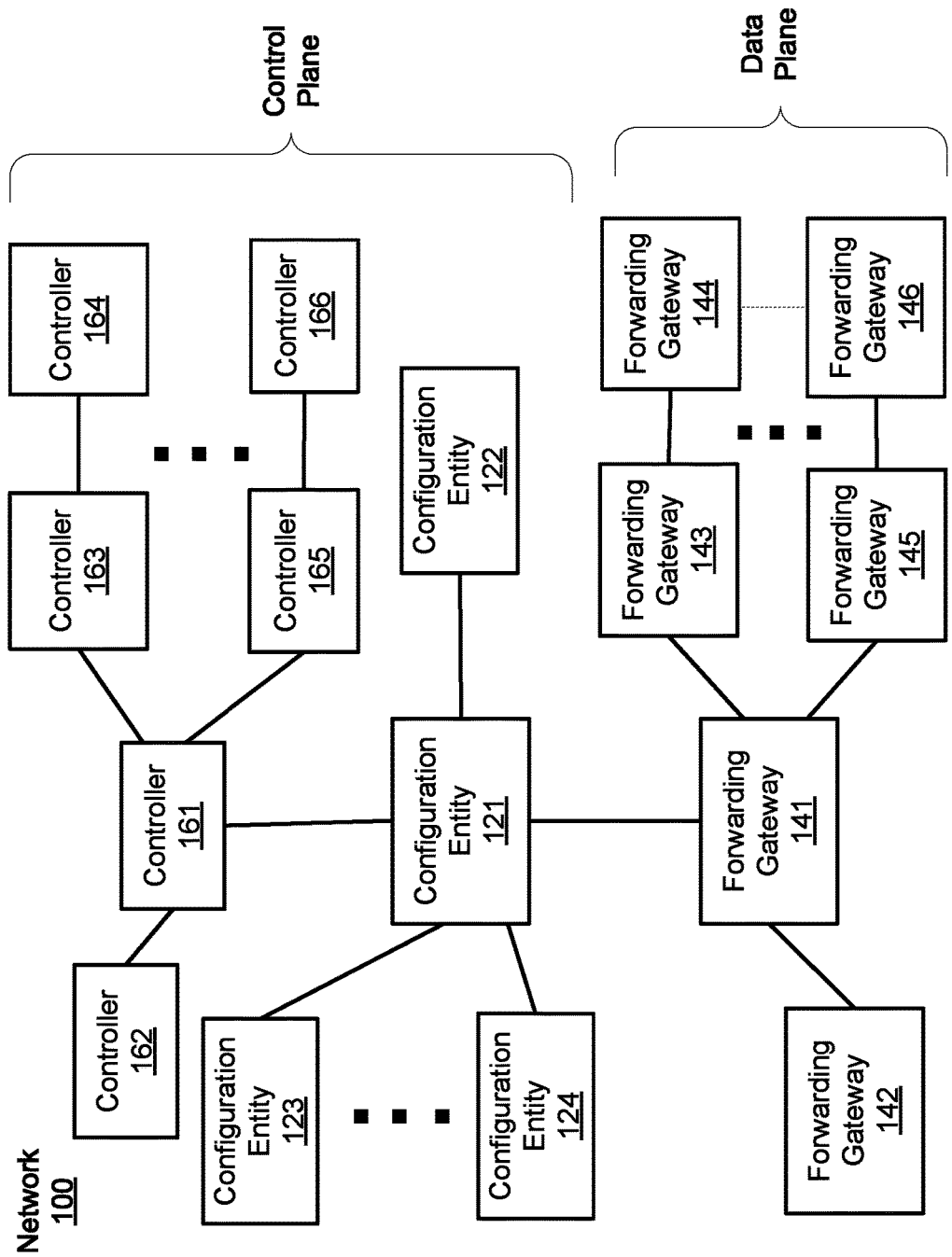
FIG. 1 is a schematic illustration of a network having multiple controllers, forwarding gateways and configuration entities, according to an embodiment.

FIG. 1 is a schematic illustration of a network 100 having multiple controllers (e.g., controllers 161-166), forwarding gateways (e.g., forwarding gateways 141-146) and configuration entities (e.g., configuration entities 121-124), according to an embodiment. Although not shown in FIG. 1, the network 100 includes a set of network nodes such as, for example, access devices, computer devices, service devices, routing devices, storage devices, and/or the like. Each controller, forwarding gateway or configuration entity is hosted and executed at a network node from the set of network nodes. Each controller, forwarding gateway or configuration entity within the network 100 is directly and/or operatively coupled to each remaining controller, forwarding gateway or configuration entity within the network 100.

The network 100 has a control plane that includes at least the controllers (e.g., the controllers 161-166) and/or the configuration entities (e.g., the configuration entities 121-124) of the network 100. The control plane of the network 100, for example, controls operations of network nodes and communication sessions between the network nodes within the network 100. The network 100 also has a data plane that includes at least the forwarding gateways (e.g., the forwarding gateways 141-146) of the network 100. The data plane of the network 100, for example, manages data transmission between the network nodes within the network 100.

In some embodiments, the network 100 can include one or more resiliency domains, each of which includes a collection of controllers, forwarding gateways, configuration entities and/or other network nodes. For example, a resiliency domain in the network 100 includes the controllers 161-166, the forwarding gateways 141-146 and the configuration entities 121-124. Although not shown in FIG. 1, the network 100 can include other resiliency domains. Each resiliency domain is a domain of high availability resilient to any single entity failure within that resiliency domain. That is, failure of an entity (e.g., a controller, a forwarding gateway, a configuration entity) within a resiliency domain will not negatively affect operations of other entities (e.g., controllers, forwarding gateways, configuration entities) within that resiliency domain. Furthermore, entities (e.g., controllers, forwarding gateways, configuration entities) within a resiliency domain are managed, controlled and/or configured in a coordinated manner, independent of entities within another resiliency domain. Each class of entity (e.g., the class of controllers, the class of forwarding gateways, the class of configuration entities) within a resiliency domain communicates and shares data within that class of entity, independent of other classes of entity within the same resiliency domain. Details of the management and operations of entities within a resiliency domain are further described below.

In a resiliency domain of the network 100, a configuration entity (e.g., the configuration entities 121-124) can be any entity (e.g., a module, a device) that can be used to configure other entities (e.g., controllers, forwarding gateways) within that resiliency domain. Such a configuration entity can be hosted and executed at, for example, a service device, a compute device, a routing device, and/or the like, in the network 100. The configuration entity can be directly or operatively coupled to other configuration entities and other entities that are configured by that configuration entity. In some embodiments, a configuration entity can be accessed and operated by, for example, an administrator of the network 100, such that the configuration entity can receive manual commands and/or instructions associated with configuring other entities.

In some embodiments, a master configuration entity and a backup configuration entity can be designated and configured (e.g., by a network administrator) for an entire resiliency domain of the network 100. Other configuration entities within the resiliency domain, which are not designated as the master or backup configuration entity, can function as subordinate configuration entities for the resiliency domain. The master configuration entity can configure and send operational commands to other entities within the resiliency domain, including the controllers and forwarding gateways. The master configuration entity can also manage the subordinate configuration entities. For example, the master configuration entity can be configured to distribute configuration information associated with other entities (e.g., controllers, forwarding gateways) to the subordinate configuration entities.

The backup configuration entity can have substantially the same configuration parameters, information and/or data (i.e., is a mirror entity) as the master configuration entity. As a result, the master configuration entity can fail over to the backup configuration entity when the master configuration entity fails to function as the master configuration entity for the resiliency domain. In some embodiments, failure at the master configuration entity can be detected by the master configuration entity and the backup configuration entity. In response to detection of the failure, the backup configuration entity can automatically transition into a new master configuration entity without intervention from any external entity (e.g., a network administrator). Additionally, in some embodiments, a third configuration entity can be designated and configured as a new backup configuration entity when the previous backup configuration entity transitions into a new master configuration entity for the resiliency domain. In such embodiments, the new backup configuration entity can be designated and configured, for example, manually by a network administrator or automatically by the previous backup configuration entity (i.e., the new master configuration entity).

In the example shown in FIG. 1, the configuration entity 121 can be designated and configured as the master configuration entity for a resiliency domain in the network 100; the configuration entity 122 can be designated and configured as the backup configuration entity for the resiliency domain; thus other configuration entities (e.g., the configuration entities 123, 124) are subordinate configuration entities for the resiliency domain. As a result, the configuration entity 121 handles configuration and operational commands for the controllers (e.g., the controllers 161-166) and the forwarding gateways (e.g., the forwarding gateways 141-146). The configuration entity 121 is configured to distribute configuration information associated with the controllers and the forwarding gateways to the configuration entities 123, 124. Furthermore, the configuration entity 121 can fail over to the configuration entity 122 when the configuration entity 121 fails to function as the master configuration entity for the resiliency domain.

Figure 2:
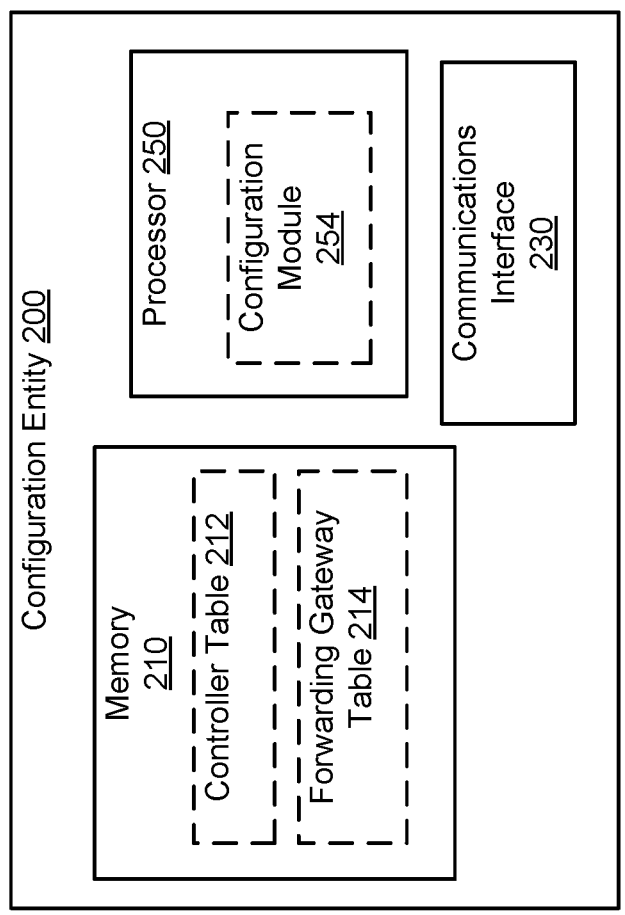
FIG. 2 is a block diagram of a configuration entity, according to an embodiment.

FIG. 2 is a block diagram of a configuration entity 200, according to an embodiment. The configuration entity 200 can be a master configuration entity for a resiliency domain of a network, similar to the configuration entity 121 in FIG. 1. As shown in FIG. 2, the configuration entity 200 includes a communications interface 230; a memory 210, which contains a controller table 212 and a forwarding gateway table 214; and a processor 250, which contains a configuration module 254. Operations of the communications interface 230 (e.g., transmit/receive signals) and the configuration module 254 (e.g., configuring a controller or a forwarding gateway), as well as manipulations on the controller table 212, the forwarding gateway table 214 (e.g., modify an entry) or any other portion of the memory 210, can be controlled by the processor 250.

In some embodiments, the communications interface 230 of the configuration entity 200 can be associated with one or multiple ports (for wired connections, not shown in FIG. 2) and/or antennas (for wireless connections, not shown in FIG. 2) of the configuration entity 200 or a device (e.g., a server)

(or an entity) that hosts the configuration entity 200. The communications interface 230 and the associated ports and/or antennas can be used to implement one or more wired and/or wireless connections between the configuration entity 200 and a backup configuration entity (e.g., the configuration entity 122 in FIG. 1), subordinate configuration entities (e.g., the configuration entities 123, 124), and other entities (e.g., controllers, forwarding gateways). Among those connections, the wired connections can be, for example, twisted-pair electrical signaling via electrical cables, fiber-optic signaling via fiber-optic cables, and/or the like; and the wireless connections can be based on any suitable wireless communication protocols (e.g., a Bluetooth protocol, a Wi-Fi protocol, etc.). As such, the configuration entity 200 can be configured to receive signals (e.g., configuration information, control signals) from and/or send signals to the backup configuration entity, the subordinate configuration entities, and/or other entities through one or more ports and/or antennas associated with the communications interface 230.

The processor 250 can be any suitable processor configured to run and/or execute the module(s) included in the processor 250. Each module in the processor 250 can be any combination of hardware-based module (e.g., a field-programmable gate array (FPGA), an application specific integrated circuit (ASIC), a digital signal processor (DSP)) and/or software-based module (e.g., a module of computer code stored in memory and/or executed at the processor 250) capable of performing one or more specific functions associated with that module. Specifically, the configuration module 254 can be associated with configuring the controllers and forwarding gateways within the same resiliency domain. Additionally, in some embodiments, the processor 250 can include other module(s) (not shown in FIG. 2) configured to perform other function(s) for the configuration entity 200. For example, the processor 250 can include a module configured to distribute configuration information to the subordinate configuration entities within the resiliency domain.

In some embodiments, the memory 210 can be, for example, a random-access memory (RAM) (e.g., a dynamic RAM, a static RAM), a flash memory, a removable memory, and/or so forth. The configuration information associated with configuring the controllers and forwarding gateways in the resiliency domain can be stored, maintained and updated in the memory 210. Specifically, configuration information associated with the controllers in the resiliency domain can be stored, maintained and updated in the controller table 212. Similarly, configuration information associated with the forwarding gateways in the resiliency domain can be stored, maintained and updated in the forwarding gateway table 214.

In some embodiments, although not shown in FIG. 2, other information associated with the controllers and/or the forwarding gateways in the resiliency domain can also be stored, maintained and updated in the memory 210 (e.g., in the controller table 212, the forwarding gateway table 214 and/or other database structures). For example, information associated with the status of a controller (e.g., master controller, backup controller, primary controller, secondary controller, as described in detail below) or a forwarding gateway (e.g., master forwarding gateway, backup forwarding gateway, primary forwarding gateway, secondary forwarding gateway, as described in detail below) can be stored in the controller table 212 or the forwarding gateway table 214, respectively.

In some embodiments, although not shown in FIG. 2, information and/or data other than that associated with the controllers and the forwarding gateways can also be stored in the memory 210 and/or used by the configuration entity 200. For example, information associated with the backup configuration entity can be stored, maintained and updated in the memory 210, such that the configuration entity 200 can fail over to the backup configuration entity when appropriate. For another example, information associated with the subordinate configuration entities in the resiliency domain can be stored, maintained and updated in the memory 210, such that the configuration entity 200 can distribute configuration information to the subordinate configuration entities when needed.

Returning to FIG. 1, a controller (e.g., the controller 161-166) in a resiliency domain of the network 100 can be any entity (e.g., a module, a device) that can be configured to control network nodes and communication sessions in the resiliency domain in the network 100. Similar to the configuration entity described above, a controller can be hosted and executed at, for example, a service device, a compute device, a routing device, and/or the like, in the network 100. The controller can be directly or operatively coupled to other controllers in the resiliency domain and at least one configuration entity (e.g., the master configuration entity) that configures that controller. As described above, each controller in the resiliency domain is configured by the master configuration entity of the resiliency domain.

In some embodiments, a master controller and a backup controller can be designated and configured (e.g., by a network administrator, by the master configuration entity) for the entire resiliency domain of the network 100. Other controllers within the resiliency domain, which are not designated as the master or backup controller, can function as subordinate controllers for the resiliency domain. The master controller can manage the subordinate controllers to control network nodes and communication sessions for the resiliency domain. Specifically, the master controller can designate, from the subordinate controllers, a primary controller and a secondary controller for each network node within the resiliency domain. Particularly, the master controller can be configured to send a signal to each of two subordinate controllers, designating one subordinate controller as a primary controller and another subordinate controller as a secondary controller, for each incoming network node when that network node joins the resiliency domain.

In some embodiments, the master controller can load balance node management across all the subordinate controllers in the resiliency domain. In such embodiments, the master controller can designate subordinate controllers as a primary controller or secondary controller for a network node based on various considerations such as, management load on each subordinate controller (e.g., the number of network nodes for which that subordinate controller is designated as a primary controller), available capacity and/or resources at each subordinate controller, traffic load on each network node, physical and/or logical distance between a subordinate controller and a network node, and/or the like. For example, the master controller can designate a subordinate controller with a relatively high capacity (e.g., high available bandwidth, high processing capability, more memory space) as the primary or secondary controller for an incoming network node.

In some embodiments, the master controller can designate the subordinate controllers as primary controllers and/or secondary controllers by, for example, dynamically executing a load distribution method for the subordinate controllers. In some embodiments, depending on the capacity and resource availability at each subordinate controller, the master controller can designate a subordinate controller as the primary controller (or the secondary controller) for more than one network node, or as the primary controller for a first network node and as the secondary controller for a second network node, and/or the like. Overall, the responsibility of node management can be load balanced by the master controller across all the subordinate controllers.

A primary controller designated for a network node can be configured to manage session (active sessions and inactive sessions) state and node state associated with that network node (details are further described below). Such session state and node state managed by the primary controller are further mirrored to the secondary controller designated for the network node. As a result, the primary controller can fail over to the secondary controller when the primary controller fails to function as the primary controller for the network node (e.g., fails to manage node state and/or session state). Thus, the secondary controller can take over the node management and session management of the network node from the primary controller, such that operations of the network node are not interrupted or disturbed.

In some embodiments, the master controller can be configured to monitor the primary controller and further control the fail-over process. In other embodiments, alternatively, the primary controller and the secondary controller can automatically detect the failure and perform the fail-over process without intervention from the master controller or any other external entity. Additionally, after the primary controller fails over to the secondary controller, the master controller can be configured to send a signal to a third controller, designating that third controller as a new secondary controller for the network node.

Similar to the master configuration entity and the backup configuration entity described above, the backup controller can have substantially the same configuration parameters, information and/or data (i.e., is a mirror entity) as the master controller. As a result, the master controller can fail over to the backup controller when the master controller fails to function as the master controller for the resiliency domain. In some embodiments, failure at the master controller can be detected by the master controller and the backup controller. In response to detection of the failure, the backup controller can automatically transition into a new master controller for the resiliency domain without intervention from any external entity (e.g., the master configuration entity, a network administrator). In other embodiments, alternatively, the master configuration entity or a network administrator can detect the failure at the master controller and then initiate the fail-over process for the master controller and the backup controller. Additionally, in some embodiments, a third controller can be designated and configured (e.g., by the master configuration entity, by the network administrator) as a new backup controller after the previous backup controller transitions into a new master controller for the resiliency domain.

Following the example shown in FIG. 1, the controller 161 can be designated and configured by the configuration entity 121 (the master configuration entity) as the master controller for the resiliency domain in the network 100; the controller 162 can be designated and configured by the configuration entity 121 as the backup controller for the resiliency domain; and other controllers (e.g., the controllers 163-166) are configured by the configuration entity 121 as subordinate controllers for the resiliency domain. Furthermore, the controller 161 is configured to send signals to the subordinate controllers (e.g., the controllers 163-166), designating the subordinate controllers as primary and/or secondary controllers for each network node within the resiliency domain. For example, the controller 161 can send a signal to the controller 163 designating the controller 163 as the primary controller for a first network node (not shown in FIG. 1), and send a signal to the controller 164 designating the controller 164 as the secondary controller for the first network node. Similarly, the controller 161 can send a signal to the controller 165 designating the controller 165 as the primary controller for a second network node (not shown in FIG. 1), and send a signal to the controller 166 designating the controller 166 as the secondary controller for the second network node.

As a result, the controller 163 is configured to manage node state and session state for the first network node; the controller 165 is configured to manage node state and session state for the second network node. The controller 163 can fail over to the controller 164 when the controller 163 fails to function as the primary controller for the first network node; the controller 165 can fail over to the controller 166 when the controller 165 fails to function as the primary controller for the second network node. In addition, the controller 161 can fail over to the controller 162 when the controller 161 fails to function as the master controller for the resiliency domain.

Figure 3:
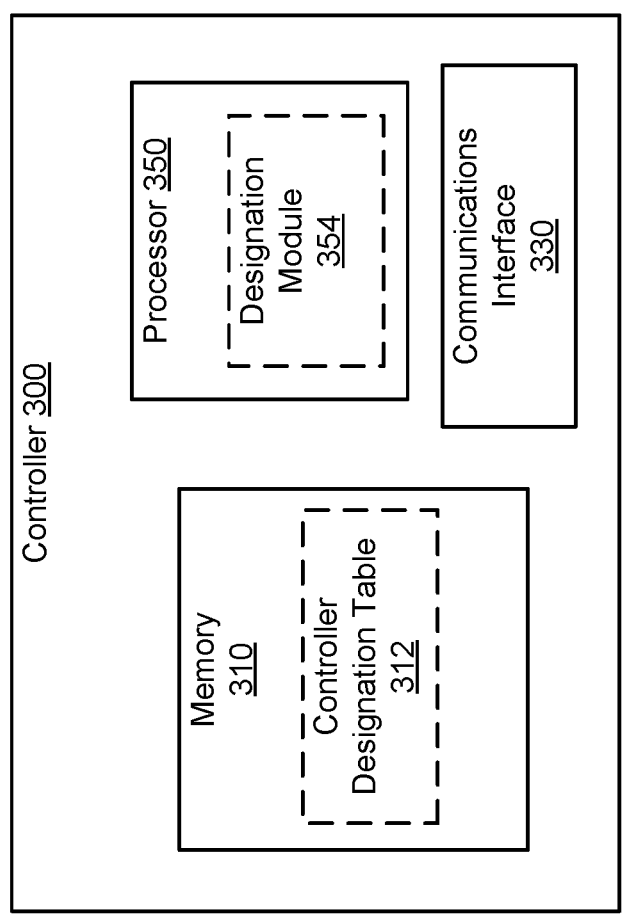
FIG. 3 is a block diagram of a controller, according to an embodiment.

FIG. 3 is a block diagram of a controller 300, according to an embodiment. The controller 300 can be a master controller for a resiliency domain in a network, similar to the controller 161 in FIG. 1. As shown in FIG. 3, the controller 300 includes a communications interface 330; a memory 310, which contains a controller designation table 312; and a processor 350, which contains a designation module 354. Operations of the communications interface 330 (e.g., transmit/receive signals) and the designation module 354 (e.g., designating a subordinate controller), as well as manipulations on the controller designation table 312 (e.g., modify an entry) or any other portion of the memory 310, can be controlled by the processor 350.

The communications interface 330 of the controller 300 can be similar to the communications interface 230 of the configuration entity 200 shown and described with respect to FIG. 2. Specifically, the communications interface 330 can be associated with one or multiple ports and/or antennas of the controller 300 or a device (or entity) that hosts the controller 300. The communications interface 330 and the associated ports and/or antennas can be used to implement one or more wired and/or wireless connections between the controller 300 and a backup controller (e.g., the controller 162 in FIG. 1), subordinate controllers (e.g., the controllers 163-166 in FIG. 1), and other entities (e.g., configuration entities, forwarding gateways). As such, the controller 300 can be configured to receive signals (e.g., configuration information, control signals) from and/or send signals (e.g., designation signals) to the backup controller, the subordinate controllers, and/or other entities through one or more ports and/or antennas associated with the communications interface 330.

The processor 350 can be any suitable processor configured to run and/or execute the module(s) included in the processor 350. Each module in the processor 350 can be any combination of hardware-based module (e.g., a FPGA, an ASIC, a DSP) and/or software-based module (e.g., a module of computer code stored in memory and/or executed at the processor 350) capable of performing one or more specific functions associated with that module. Particularly, the designation module 354 can be associated with designating the subordinate controllers as primary controllers and/or secondary controllers for network nodes within the resiliency domain. Specifically, the designation module 354 can be configured to determine controller designation for an incoming network node; send designating signals to the corresponding subordinate controllers; update the controller designation table 312 accordingly; etc. Additionally, in some embodiments, the processor 350 can include other module(s) (not shown in FIG. 3) configured to perform other function(s) for the controller 300. For example, the processor 350 can include a module configured to manage node state and session state for a network node, for which the controller 300 functions as the primary controller.

In some embodiments, the memory 310 can be, for example, a RAM (e.g., a dynamic RAM, a static RAM), a flash memory, a removable memory, and/or so forth. Information associated performing functions for the controller 300 can be stored in the memory 310. Particularly, information associated with designating subordinate controllers as primary and/or secondary controllers for network nodes in the resiliency domain is stored, maintained and updated in the controller designation table 312 in the memory 310.

FIG. 4 is a schematic illustration of a controller designation table 400 implemented in a controller, according to an embodiment. The controller designation table 400 can be similar to the controller designation table 312 in FIG. 3. The controller that hosts the controller designation table 400 can be a master controller for a resiliency domain in a network, similar to the controller 161 in FIG. 1 or the controller 300 in FIG. 3.

As shown in FIG. 4, the controller designation table 400 has three columns: node identifier 420, primary controller 440 and secondary controller 460. Each entry (i.e., row) of the controller designation table 400 defines designation of controllers for a network node in the resiliency domain. That is, each entry of the controller designation table 400 stores information associated with the controllers (i.e., a primary controller and a secondary controller) designated for a network node in the resiliency domain.

Specifically, the first column, node identifier 420, contains node identifiers (e.g., node identifiers 1, 2, 3, 4), each of which uniquely identifies a network node within the resiliency domain. A node identifier can be, for example, a number, a text string, a symbol, a binary data or in any other suitable format that can be used to uniquely identify a network node. The second column, primary controller 440, contains identifiers of controllers (e.g., controllers 1, 2, 3) that are designated as the primary controller for the corresponding network node. An identifier of a controller can be represented in the controller designation table 400 by, for example, a number, a text string, a symbol, a binary data or in any other format that can be used to uniquely identify that controller. Similar to the second column, the third column, secondary controller 460, contains identifiers of controllers (e.g., controllers 1, 2, 4) that are designated as the secondary controller for the corresponding network node.

In the example of FIG. 4, the controller 1 and the controller 2 are designated (e.g., by a master controller for the resiliency domain) as the primary controller and the secondary controller, respectively, for the network node identified by the node identifier 1. As a result, the controller 1 is configured to manage node state and session state for the network node identified by the node identifier 1. Furthermore, the controller 1 can be configured to fail over to the controller 2 if the controller 1 fails to function as the primary controller for the network node identified by the node identifier 1. Similarly, the controller 2 and the controller 1 are designated as the primary controller and the secondary controller, respectively, for the network node identified by the node identifier 2. The controller 1 and the controller 4 are designated as the primary controller and the secondary controller, respectively, for the network node identified by the node identifier 3. The controller 3 and the controller 2 are designated as the primary controller and the secondary controller, respectively, for the network node identified by the node identifier 4.

In some embodiments, the controller designation table 400 can be maintained and updated by, for example, a designation module (e.g., the designation module 354 in FIG. 3) of the master controller that hosts the controller designation table 400. For example, when a network node joins the resiliency domain, the designation module designates a primary controller and a secondary controller for the network node, and then defines a new entry for that network node in the controller designation table 400 accordingly. For another example, when a primary controller for a network node fails over to a secondary controller for that network node and a new secondary controller is designated for that network node, the designation module modifies the entry for that network node in the controller designation table 400 accordingly.

Returning to FIG. 3, information and/or data other than the information associated with controller designation (i.e., stored in the controller designation table 312) can also be stored in the memory 310. For example, information and/or data associated with the network node(s) managed by the controller 300 (i.e., as the primary controller for the network node(s)) can be stored in, for example, a database (not shown in FIG. 3) in the memory 310. For another example, information associated with the backup controller can be stored in the memory 310, such that the controller 300 can fail over to the backup controller when needed.

In the network 100 in FIG. 1, a forwarding gateway (e.g., the forwarding gateways 141-146) can be any entity (e.g., a module, a device) that can be configured to function as an anchoring point for a VLAN and provide connectivity to that VLAN for other devices (or entities) in the resiliency domain in the network 100. A VLAN in the network 100 can include multiple network nodes (e.g., user devices, access devices, etc.) across the network 100. In some embodiments, communication sessions associated with a VLAN can be identified by, for example, a VLAN identifier that is uniquely designated to that VLAN. In such embodiments, each data unit (e.g., data packet, data cell, data frame) from a communication session of the VLAN (e.g., destined to and/or sent from a device of the VLAN) can be tagged by the VLAN identifier that is included in the data unit.

Similar to the configuration entity and the controller described above, a forwarding gateway can be hosted and executed at, for example, a service device, a compute device, a routing device, and/or the like, in the network 100. The forwarding gateway can be directly or operatively coupled to other forwarding gateways in the resiliency domain and at least one configuration entity (e.g., the master configuration entity) that configures that forwarding gateway. As described above, each forwarding gateway in the resiliency domain is configured by the master configuration entity of the resiliency domain.

In some embodiments, a master forwarding gateway and a backup forwarding gateway can be designated and configured (e.g., by a network administrator, by the master configuration entity) for the entire resiliency domain of the network 100. Other forwarding gateways within the resiliency domain, which are not designated as the master or backup forwarding gateway, can function as subordinate forwarding gateways for that resiliency domain. The master forwarding gateway can control the subordinate forwarding gateways to serve as anchoring points for the VLANs. Specifically, the master forwarding gateway can be configured to designate, from the subordinate forwarding gateways, a primary forwarding gateway and a secondary forwarding gateway for each VLAN associated with the resiliency domain. Particularly, the master forwarding gateway can be configured to send a signal to each of two subordinate forwarding gateways, designating one subordinate forwarding gateway as a primary forwarding gateway and another subordinate forwarding gateway as a secondary forwarding gateway for each VLAN associated with the resiliency domain.

The master forwarding gateway can designate subordinate forwarding gateways as anchoring points for VLANs in various methods. In some embodiments, for example, the master forwarding gateway can perform the designating function (i.e., designate a subordinate forwarding gateway as a primary forwarding gateway and another subordinate forwarding gateway as a secondary forwarding gateway for each VLAN) by using a specific VLAN-load-distribution method. The master forwarding gateway can then send a signal to each designated subordinate forwarding gateway with instructions for that subordinate forwarding gateway to be appropriately configured. In response to the signal, a designated subordinate forwarding gateway can be configured based on the instructions such that the subordinate forwarding gateway can function as a primary forwarding gateway or a secondary forwarding gateway for that VLAN.

In some embodiments, the master forwarding gateway can load balance VLAN management across all subordinate forwarding gateways in the resiliency domain. In such embodiments, the master forwarding gateway can designate the subordinate forwarding gateways as anchoring points (e.g., primary or secondary forwarding gateways) for VLANs based on various considerations such as, for example, traffic load on the subordinate forwarding gateways, number of active sessions in a VLAN, physical and/or logical distance between a subordinate forwarding gateway and devices of a VLAN, and/or the like. For example, a subordinate forwarding gateway with a light traffic load has a higher probability to be designated as a primary forwarding gateway for a VLAN; while a subordinate forwarding gateway with a heavy traffic load has a higher probability to be designated as a secondary forwarding gateway for a VLAN. For another example, a subordinate forwarding gateway with a larger capacity can be designated as a primary forwarding gateway for a VLAN with a large number of active sessions; while a subordinate forwarding gateway with a smaller capacity can be designated as a primary forwarding gateway for a VLAN with a small number of active sessions.

In some embodiments, depending on the capacity and resource availability at each subordinate forwarding gateway, the master forwarding gateway can be configured to designate a subordinate forwarding gateway as the primary forwarding gateway (or the secondary forwarding gateway) for more than one VLAN, or as the primary forwarding gateway for a first VLAN and as the secondary forwarding gateway for a second VLAN, and/or the like. In some embodiments, an arbitrary number of VLANs can be dynamically load-balanced among forwarding gateways. That is, depending on changes in the traffic load, the number of active sessions in a given VLAN and/or other factors, a forwarding gateway can be dynamically designated or de-designated as an anchoring point (e.g., primary forwarding gateway, secondary forwarding gateway) for that VLAN.

A primary forwarding gateway designated for a VLAN can be configured to serve as an anchoring point for the VLAN (details are further described below). The anchoring information associated with the VLAN can be synced from the primary forwarding gateway to (i.e., mirrored to) the secondary forwarding gateway designated for the VLAN. As a result, the primary forwarding gateway can fail over to the secondary forwarding gateway when the primary forwarding gateway fails to function as the primary forwarding gateway for the VLAN (e.g., fails to serve as an anchoring point for the VLAN). Thus, the secondary forwarding gateway can take over the anchoring functionality of the VLAN from the primary forwarding gateway, such that data transmission associated with the VLAN is not interrupted.

In some embodiments, the master forwarding gateway can be configured to monitor the primary forwarding gateway and further control the fail-over process. In other embodiments, alternatively, the primary forwarding gateway and the secondary forwarding gateway can automatically detect the failure and perform the fail-over process without intervention from the master forwarding gateway or any other external entity. Additionally, after the primary forwarding gateway fails over to the secondary forwarding gateway, the master forwarding gateway can be configured to send a signal to a third forwarding gateway, designating that third forwarding gateway as a new secondary forwarding gateway for the network node.

Similar to the master/backup configuration entity and the master/backup controller described above, the backup forwarding gateway can have substantially the same configuration parameters, information and/or data (i.e., is a mirror entity) as the master forwarding gateway. As a result, the master forwarding gateway can fail over to the backup forwarding gateway when the master forwarding gateway fails to function as the master forwarding gateway for the resiliency domain. In some embodiments, failure at the master forwarding gateway can be detected by the master forwarding gateway and the backup forwarding gateway. In response to detection of the failure, the backup forwarding gateway can automatically transition into a new master forwarding gateway for the resiliency domain without intervention from any external entity (e.g., the master configuration entity, a network administrator). In other embodiments, alternatively, the master configuration entity or a network administrator can detect the failure at the master forwarding gateway and then operate the fail-over process for the master forwarding gateway and the backup forwarding gateway. Additionally, in some embodiments, a third forwarding gateway can be designated and configured (e.g., by the master configuration entity, by the network administrator) as a new backup forwarding gateway after the previous backup forwarding gateway transitions into a new master forwarding gateway for the resiliency domain.

Following the example shown in FIG. 1, the forwarding gateway 141 can be designated and configured by the configuration entity 121 (as the master configuration entity) as the master forwarding gateway for the resiliency domain in the network 100; the forwarding gateway 142 can be designated and configured by the configuration entity 121 as the backup forwarding gateway for the resiliency domain; and other forwarding gateways (e.g., the forwarding gateways 143-146) are configured by the configuration entity 121 as subordinate forwarding gateways for the resiliency domain. Furthermore, the forwarding gateway 141 is configured to send signals to the subordinate forwarding gateways (e.g., the forwarding gateways 143-146), designating the subordinate forwarding gateways as primary and/or secondary forwarding gateways for each VLAN associated with the resiliency domain. For example, the forwarding gateway 141 can send a signal to the forwarding gateway 143 designating the forwarding gateway 143 as the primary forwarding gateway for a first VLAN (not shown in FIG. 1), and send a signal to the forwarding gateway 144 designating the forwarding gateway 144 as the secondary forwarding gateway for the first VLAN. Similarly, the forwarding gateway 141 can send a signal to the forwarding gateway 145 designating the forwarding gateway 145 as the primary forwarding gateway for a second VLAN (not shown in FIG. 1), and send a signal to the forwarding gateway 146 designating the forwarding gateway 146 as the secondary forwarding gateway for the second VLAN.

As a result, the forwarding gateway 143 is configured to serve as an anchoring point for the first VLAN; the forwarding gateway 145 is configured to serve as an anchoring point for the second VLAN. The forwarding gateway 143 can fail over to the forwarding gateway 144 when the forwarding gateway 143 fails to function as the primary forwarding gateway for the first VLAN; the forwarding gateway 145 can fail over to the forwarding gateway 146 when the forwarding gateway 145 fails to function as the primary forwarding gateway for the second VLAN. In addition, the forwarding gateway 141 can fail over to the forwarding gateway 142 when the forwarding gateway 141 fails to function as the master forwarding gateway for the resiliency domain.

Figure 5:
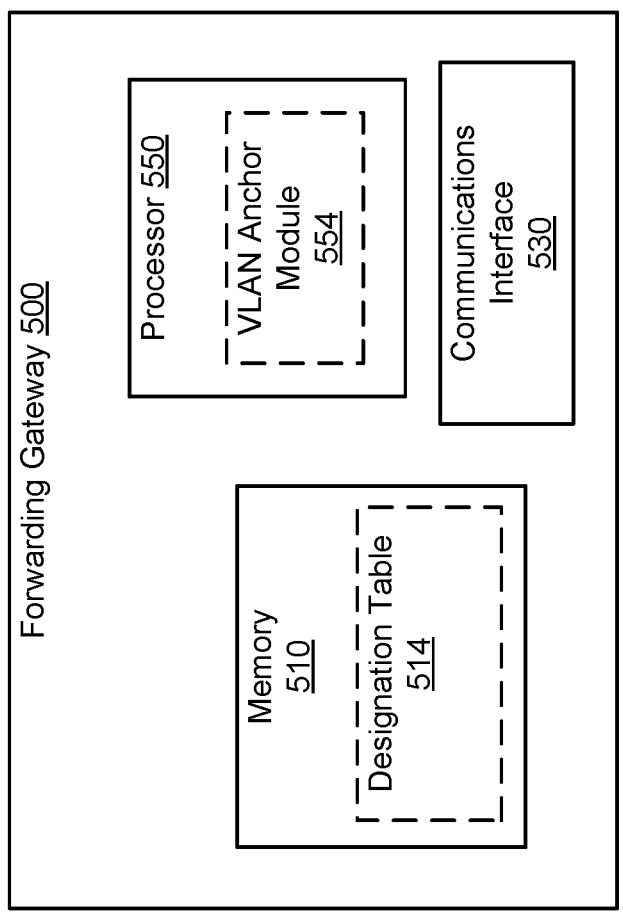
FIG. 5 is a block diagram of a forwarding gateway, according to an embodiment.

FIG. 5 is a block diagram of a forwarding gateway 500, according to an embodiment. The forwarding gateway 500 can be a primary forwarding gateway designated for a VLAN associated with a resiliency domain in a network, similar to the forwarding gateway 143 in FIG. 1. As shown in FIG. 5, the forwarding gateway 500 includes a communications interface 530; a memory 510, which contains a designation table 514; and a processor 550, which contains a VLAN anchor module 554. Operations of the communications interface 530 (e.g., transmit/receive signals) and the VLAN anchor module 554 (e.g., advertising subnet routes for the VLAN), as well as manipulations on the designation table 514 (e.g., modify an entry) or any other portion of the memory 510, can be controlled by the processor 550.

The communications interface 530 of the forwarding gateway 500 can be similar to the communications interface 230 of the configuration entity 200 and the communications interface 330 of the controller 300 shown and described with respect to FIGS. 2 and 3. Specifically, the communications interface 530 can be associated with one or multiple ports and/or antennas of the forwarding gateway 500 or a device (or entity) that hosts the forwarding gateway 500. The communications interface 530 and the associated ports and/or antennas can be used to implement one or more wired and/or wireless connections between the forwarding gateway 500 and a secondary forwarding gateway (e.g., the forwarding gateway 144 in FIG. 1), the master forwarding gateway (e.g., the forwarding gateway 141 in FIG. 1), and other entities (e.g., configuration entities, controllers). As such, the forwarding gateway 500 can be configured to receive signals (e.g., configuration information, control signals) from and/or send signals to the secondary forwarding gateway, the master forwarding gateway, and/or other entities through one or more ports and/or antennas associated with the communications interface 530.

The processor 550 can be any suitable processor configured to run and/or execute the module(s) included in the processor 550. Each module in the processor 550 can be any combination of hardware-based module (e.g., a FPGA, an ASIC, a DSP) and/or software-based module (e.g., a module of computer code stored in memory and/or executed at the processor 550) capable of performing one or more specific functions associated with that module. Particularly, the VLAN anchor module 554 can be configured to manage the anchoring functionality of the forwarding gateway 500 with respect to one or more VLANs. Specifically, the VLAN anchor module 554 is configured to maintain and update the designation table 514; advertise subnet routes of VLANs (for which the forwarding gateway 500 is designated as a primary forwarding gateway) to other devices (e.g., controllers); receive and forward upstream traffic and downstream traffic for VLANs (for which the forwarding gateway 500 is designated as a primary forwarding gateway) based on information stored in the memory 510 (e.g., in the designation table 514), and/or the like. Additionally, in some embodiments, the processor 550 can include other module(s) (not shown in FIG. 5) configured to perform other function(s) for the forwarding gateway 500. For example, the processor 550 can include a module configured to communicate with other entities (e.g., controllers, configuration entities) associated with the forwarding gateway 500.

In some embodiments, the memory 510 can be, for example, a RAM (e.g., a dynamic RAM, a static RAM), a flash memory, a removable memory, and/or so forth. Information associated with performing the anchoring function for the VLAN(s), for which the forwarding gateway 500 is designated as a primary forwarding gateway, can be stored in the memory 510. Particularly, information associated with the designated roles for the forwarding gateway 500 with respect to the VLAN(s) is stored, maintained and updated in the designation table 514 in the memory 510.

FIG. 6 is a schematic illustration of a designation table 600 implemented in a forwarding gateway, according to an embodiment. The designation table 600 can be similar to the designation table 514 in FIG. 5. The forwarding gateway that hosts the designation table 600 can be a primary and/or secondary forwarding gateway designated for one or multiple VLANs associated with a resiliency domain in a network, similar to the forwarding gateways 143-146 in FIG. 1 or the forwarding gateway 500 in FIG. 5.

As shown in FIG. 6, the designation table 600 has two columns: VLAN identifier 620 and status 640. Each entry (i.e., row) of the designation table 600 defines the status of the forwarding gateway with respect to a VLAN associated with the resiliency domain. In other words, each entry of the designation table 600 stores information associated with the status of the forwarding gateway (i.e., a primary forwarding gateway, a secondary forwarding gateway, or not available (N/A)) that is designated to the forwarding gateway by a master forwarding gateway with respect to a VLAN associated with the resiliency domain.

Specifically, the first column, VLAN identifier 620, contains VLAN identifiers (e.g., VLAN identifiers 1, 2, 3, 4, 5), each of which uniquely identifies a VLAN associated with the resiliency domain. A VLAN identifier can be, for example, a number, a text string, a symbol, a binary data or in any other suitable format that can be used to uniquely identify a VLAN. The second column, status 640, contains status indicators of the forwarding gateway (e.g., primary, secondary, N/A) that are designated to the forwarding gateway by the master forwarding gateway with respect to the corresponding VLANs.

In the example of FIG. 6, the forwarding gateway (e.g., the forwarding gateway 143-146 in FIG. 1, the forwarding gateway 500 in FIG. 5) that hosts the designation table 600 is designated by the master forwarding gateway as a primary forwarding gateway for the VLANs identified by the VLAN identifiers 1 and 3; and designated by the master forwarding gateway as a secondary forwarding gateway for the VLANs identified by the VLAN identifiers 2 and 4. The forwarding gateway is not designated by the master forwarding gateway as a primary or secondary forwarding gateway for the VLAN identified by the VLAN identifier 5.

In some embodiments, the designation table 600 can be maintained and updated by, for example, a VLAN anchor module (e.g., the VLAN anchor module 554 in FIG. 5) of the forwarding gateway that hosts the designation table 600. For example, when a VLAN joins the resiliency domain and the forwarding gateway hosting the designation table 600 is designated by a master forwarding gateway as a secondary forwarding gateway for that VLAN, the VLAN anchor module can be configured to define a new entry in the designation table 600 recording the status of the forwarding gateway as "secondary" for the VLAN. For another example, when a primary forwarding gateway for a VLAN (for which the forwarding gateway hosting the designation table 600 is designated as a secondary forwarding gateway) fails, the VLAN anchor module can be configured to take over the anchoring responsibility from the primary forwarding gateway, and then modify the corresponding entry in the designation table 600 accordingly (i.e., change the status from "secondary" to "primary").

In some embodiments, although not illustrated in the figures, similar modules and/or data structures (e.g., tables, databases) can exist in both a master controller and a master forwarding gateway; and in both a subordinate controller and a subordinate forwarding gateway. For example, a master forwarding gateway (e.g., the forwarding gateway 141 in FIG. 1) can have a forwarding gateway designation table similar to the controller designation table 312 or 400 shown and described with respect to FIGS. 3 and 4. Specifically, such a forwarding gateway designation table can store information associated with designations of subordinate forwarding gateways in the resilience domain. Additionally, the master forwarding gateway can have a designation module similar to the designation module 354 in FIG. 3, which is configured to perform the function of designating subordinate forwarding gateways for VLANs. For another example, a subordinate controller (e.g., the controllers 163-166 in FIG. 1) can have a designation table similar to the designation table 514 or 600 shown and described with respect to FIGS. 5 and 6. Specifically, such a designation table can store information associated with the status of that subordinate controller (e.g., primary, secondary, N/A) with respect to the network nodes in the resiliency domain.

Returning to FIG. 1, the forwarding gateways and controllers can, in coordination, manage data transmission and forwarding for VLANs associated with the resiliency domain in the network 100. Specifically, each primary forwarding gateway (e.g., the forwarding gateways 143, 145) can be configured to advertise its VLAN anchoring role, as well as information of subnet routes of the VLAN, to all or a portion of the controllers directly or operatively coupled to that primary forwarding gateway. Based on the advertised VLAN anchoring information (e.g., information of subnet routes of the VLAN) received from the primary forwarding gateway, the controllers can be able to determine various forwarding paths for the network nodes of the VLAN (e.g., forward VLAN traffic from a network node to the primary forwarding gateway).

When a new communication session associated with the VLAN is initiated or produced, a primary controller (e.g., the controller 163 or 165) designated for a network node associated with the communication session can be configured to execute a session management function. Specifically, the primary controller can be configured to plumb forwarding path(s) associated with the communication session at the network node based on the advertised VLAN anchoring information received from the primary forwarding gateway for the VLAN. As a result, the primary controller can be configured to manage the network node with respect to forwarding traffic of the communication session according to the forwarding path (which typically includes the primary forwarding gateway for the VLAN). The primary controller thus can be configured to update the node state associated with the network node, and update the session state associated with the communication session.

Furthermore, the primary controller (or the master controller) can be configured to send a signal to the primary forwarding gateway with instructions associated with adding session forwarding state to the data plane (i.e., forwarding plane). In response to receiving such instructions, the primary forwarding gateway can be configured to add the corresponding session forwarding state to the data plane as directed by the controller.

As a result, the network node associated with the communication session can be configured to, under the control of its primary controller, send traffic of the communication session to the primary forwarding gateway according to the forwarding path. On the other hand, the primary forwarding gateway can be configured to anchor and forward traffic of the communication session to the network nodes of the VLAN. The primary forwarding gateway can further update session forwarding state in the data plane as directed by the controller (e.g., the primary controller or the master controller).

In the network 100, the resiliency mechanisms for controllers, forwarding gateways and configuration entities are independent. Specifically, the controllers, forwarding gateways or the configuration entities can fail over and backup within their own class, independent of entities of other classes. That is, as described above, each primary controller (e.g., the controller 163, 165) can fail over to a corresponding secondary controller (e.g., the controller 164, 166) independent of any forwarding gateway or configuration entity; the master controller (e.g., the controller 161) can fail over to the backup controller (e.g., the controller 162) independent of any forwarding gateway or configuration entity; each primary forwarding gateway (e.g., the forwarding gateway 143, 145) can fail over to a corresponding secondary forwarding gateway (e.g., the forwarding gateway 144, 146) independent of any controller or configuration entity; the master forwarding gateway (e.g., the forwarding gateway 141) can fail over to the backup forwarding gateway (e.g., the forwarding gateway 142) independent of any controller or configuration entity; and the master configuration entity (e.g., the configuration entity 121) can fail over to the backup configuration entity (e.g., the configuration entity 122) independent of any forwarding gateway or controller. Thus, a failure at an entity in the control plane (e.g., at a controller) or in the data plane (e.g., at a forwarding gateway) will cause a failover within the control plane or the data plane, respectively, and will not disrupt operations of the other plane (the data plane or the control plane, respectively).

In the network 100, each controller, forwarding gateway or configuration entity can be physically co-located, or located independently, with anther controller, forwarding gateway or configuration entity on a device (e.g., a server device, a routing device, a storage device). For example, each configuration entity can be co-located with a forwarding gateway or a controller on a device. In some embodiments, a controller, forwarding gateway or configuration entity can be directly coupled to another controller, forwarding gateway or configuration entity. In other embodiments, although not shown in FIG. 1, a controller, forwarding gateway or configuration entity can be operatively coupled to another controller, forwarding gateway or configuration entity via one or more intermediate devices (e.g., a routing device).

In some embodiments, although not shown in FIG. 1, a portion of the controllers, forwarding gateways and configuration entities associated with the network 100 can be located across a network (e.g., another network separate from the network 100) from the remaining controllers, forwarding gateways and configuration entities associated with the network, which are located within the network 100. Particularly, the control plane entities (e.g., controllers) can be implemented as separate tethered appliances, where the controllers can be located close to the forwarding gateways (e.g., on the same device) or located at a separate network (e.g., in a cloud, in a remote data center) operatively coupled to the network 100. As a result, the data plane and the control plane can be decoupled, and each plane can be scaled up and/or scaled down independently of each other plane.

While shown and described above with respect to FIGS. 2, 3 and 5 as the tables (e.g., the controller table 212, the forwarding gateway table 214, the controller designation table 312, the designation table 514) being included within the memories (e.g., the memory 210, 310, 510), in some other embodiments, one or more of those tables and/or other tables (not shown in the figures) can be located in a memory within a separate device (e.g., a storage device) that is operatively coupled to and accessible to the device hosting the memories (e.g., the configuration entity 200, the controller 300, the forwarding gateway 500).

While various embodiments have been described above, it should be understood that they have been presented by way of example only, not limitation, and various changes in form and details may be made. Any portion of the apparatus and/or methods described herein may be combined in any combination, except mutually exclusive combinations. The embodiments described herein can include various combinations and/or sub-combinations of the functions, components and/or features of the different embodiments described.

Some embodiments described herein relate to devices (e.g., access points, mobile communication devices) with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using Java, C++, or other programming languages (e.g., object-oriented programming languages) and development tools. Additional examples of computer code include, but are not limited to, control signals, encrypted code, and compressed code.

What is claimed is:

1. A method, comprising:
    managing session state and node state associated with a plurality of network nodes within a network and independent of a forwarding gateway within the network, the network including a configuration entity and a plurality of controllers interconnected in a mesh configuration and within the network;
    sending session state and node state to each controller within the plurality of controllers;
    receiving session state and node state from each controller within the plurality of controllers;
    automatically detecting a failure of a controller of the plurality of controllers; and
    initiating a fail-over process for the controller when the controller fails, without intervention from a master controller within the network.

2. The method of claim 1, wherein:
    the controller is a second controller,
    the managing, the sending, the receiving, the detecting and the initiating are performed at a first controller,
    the method further comprising:
    sending, from the first controller, control plane session state to the forwarding gateway such that the forwarding gateway sends data plane session state associated with a virtual local area network (VLAN) to the plurality of network nodes based on the control plane session state.

3. The method of claim 1, wherein:
    the controller is a second controller,
    the managing, the sending, the receiving, the detecting and the initiating are performed at a first controller,
    the method further comprising:
    receiving, at the first controller, a signal from the master controller designating the first controller to manage session state and node state associated with the plurality of network nodes, such that the master controller load balances the first controller with at least a third controller during a second time period after a first time period, the third controller not operatively coupled to the master controller during the first time period.

4. The method of claim 1, wherein:
    the controller is a second controller,
    the managing, the sending, the receiving, the detecting and the initiating are performed at a first controller,
    the method further comprising:
    receiving, at the first controller, a signal from the master controller designating the first controller to manage session state and node state associated with the plurality of network nodes, such that the master controller load balances the first controller with at least a third controller during a second time period after a first time period, the third controller not operatively coupled to the master controller during the first time period, the third controller being added to the network during the second time period without increasing data plane resources.

5. The method of claim 1, wherein:

the controller is a second controller, the managing, the sending, the receiving, the detecting and the initiating are performed at a first controller, the method further comprising:

receiving, at the first controller, a signal from the master controller designating the first controller to manage session state and node state associated with the plurality of network nodes, such that (1) the first controller and at least a third controller are load balanced by the master controller during a second time period after a first time period (2) control plane resources during the second time period are different than control plane resources during the first time period, and (3) data plane resources during the second time period substantially correspond to data plane resources during the first time period.

6. A method, comprising:

managing, at a first controller, session state and node state associated with a plurality of network nodes within a network and independent of a forwarding gateway within the network, the network including a configuration entity and a plurality of controllers interconnected in a mesh configuration and within the network;

automatically detecting, at the first controller, a failure of a second controller within the network, initiating, at the first controller, a fail-over process for the second controller when the controller fails, without intervention from a master controller within the network, receiving, at the first controller, a signal from the master controller designating the first controller to manage session state and node state associated with the plurality of network nodes, such that the master controller load balances the first controller with at least a third controller during a second time period after a first time period, the third controller not operatively coupled to the master controller during the first time period.

7. The method of claim 6, wherein the receiving includes receiving the signal from the master controller designating the first controller to manage session state and node state associated with the plurality of network nodes, such that the third controller is operatively coupled to the master controller during the second time period after the first time period, the third controller not operatively coupled to the master controller during the first time period, the third controller being added to the network during the second time period without increasing data plane resources.

8. The method of claim 6, wherein the receiving includes receiving the signal from the master controller designating the first controller to manage the session state and the node state associated with the plurality of network nodes such that (1) the first controller and at least a third controller are load balanced by the master controller during a second time period after the first time period (2) control plane resources during the second time period are different than control plane resources during the first time period, and (3) data plane resources during the second time period substantially correspond to data plane resources during the first time period.

9. The method of claim 6, wherein the master controller is a first master controller, the first controller is a second master controller, the second controller is a backup controller, the method further comprising:

designating, at the first controller, a primary controller and a secondary controller from a plurality of subordinate controllers within the network for each network node from the plurality of network nodes.

10. The method of claim 6, further comprising:

sending, from the first controller, control plane session state to the forwarding gateway such that the forwarding gateway sends data plane session state associated with a virtual local area network (VLAN) to the plurality of network nodes based on the control plane session state.

11. A method, comprising:

managing, at a first controller, session state and node state associated with a plurality of network nodes within a network and independent of a forwarding gateway within the network, the network including a configuration entity and a plurality of controllers interconnected in a mesh configuration and within the network;

automatically detecting, at the first controller, a failure of a second controller within the network;

initiating, at the first controller, a fail-over process for the second controller when the second controller fails, without intervention from a master controller within the network; and sending, from the first controller, control plane session state to the forwarding gateway such that the forwarding gateway sends data plane session state associated with a virtual local area network (VLAN) to the plurality of network nodes based on the control plane session state.

12. The method of claim 11, further comprising:

sending, from the first controller, session state and node state to each controller within the plurality of controllers; and receiving, at the first controller, session state and node state from each controller within the plurality of controllers.

13. The method of claim 11, wherein the first controller is physically co-located with at least one of the forwarding gateway or the configuration entity.

14. A method, comprising:

managing, at a first controller, session state and node state associated with a plurality of network nodes within a network and independent of the forwarding gateway within the network, the network including a configuration entity;

failing over, at the first controller, to a second controller when the first controller fails, without the forwarding gateway failing over and without the configuration entity failing over; and receiving, at the first controller, a signal from a master controller designating the first controller to manage session state and node state associated with the plurality of network nodes such that (1) the first controller and at least a third controller are load balanced by the master controller during a second time period, the second time period being after a first time period, (2) control plane resources during the second time period are different than control plane resources during the first time period, and (3) data plane resources during the second time period substantially correspond to data plane resources during the first time period.

15. The method of claim 14, wherein the first time period is a time period during which the third controller was not operatively coupled to the master controller.

16. The method of claim 14, wherein the first time period is a time period during which the third controller was not operatively coupled to the master controller, the third controller is added to the network during the second time period without increasing data plane resources.

17. The method of claim 14, wherein the master controller is a first master controller, the first controller is a second master controller, the second controller is a backup controller, the method further comprising:
designating, at the first controller, a primary controller and a secondary controller from a plurality of subordinate controllers within the network for each network node from the plurality of network nodes.

18. The method of claim 14, further comprising:
sending, from the first controller, session state and node state to each controller within a plurality of controllers that are interconnected in a mesh configuration and within the network; and
receiving, at the first controller, session state and node state from each controller within the plurality of controllers.

19. The method of claim 14, further comprising:
sending, from the first controller, control plane session state to the forwarding gateway such that the forwarding gateway sends data plane session state associated with a virtual local area network (VLAN) to the plurality of network nodes based on the control plane session state.

20. The method of claim 14, wherein the first controller is physically co-located with at least one of the forwarding gateway or the configuration entity.

* * * * *